(12) United States Patent
Kosaka

(10) Patent No.: US 6,743,886 B2
(45) Date of Patent: Jun. 1, 2004

(54) PLASTIC LENSES FOR SPECTACLES

(75) Inventor: Masahisa Kosaka, Tokyo (JP)

(73) Assignee: HOYA Corporation, Tokyo (JP)

(*) Notice: Subject to any disclaimer, the term of this patent is extended or adjusted under 35 U.S.C. 154(b) by 475 days.

(21) Appl. No.: 09/805,893

(22) Filed: Mar. 15, 2001

(65) Prior Publication Data
US 2001/0030734 A1 Oct. 18, 2001

(30) Foreign Application Priority Data
Mar. 15, 2000 (JP) ........................................ 2000-071534

(51) Int. Cl.$^7$ .............................................. C08G 18/52
(52) U.S. Cl. ....................... 528/73; 428/425.5; 351/159
(58) Field of Search ...................... 528/73; 428/425.5; 351/159

(56) References Cited

U.S. PATENT DOCUMENTS

| | | | |
|---|---|---|---|
| 4,904,525 A | * | 2/1990 | Taniguchi et al. |
| 5,973,098 A | * | 10/1999 | Keita et al. |
| 6,130,307 A | * | 10/2000 | Amagai et al. |

FOREIGN PATENT DOCUMENTS

| | | |
|---|---|---|
| EP | 0 562 582 A | 9/1993 |
| EP | 0 936 233 A2 | 8/1999 |
| EP | 1 099 721 A | 5/2001 |
| JP | WO89/10575 | 1/1989 |
| JP | 30-81320 | 4/1991 |
| JP | 90-71580 | 3/1997 |
| JP | 9-110979 | 4/1997 |
| JP | 9-255781 | 9/1997 |
| JP | 11-140070 | 5/1999 |
| JP | 11-180977 | 7/1999 |
| JP | 11-183702 | 7/1999 |
| JP | 11-189592 | 7/1999 |
| JP | 11-292950 | 10/1999 |
| JP | 11-352302 | 12/1999 |
| JP | 2000-256435 | 9/2000 |

OTHER PUBLICATIONS

European Search Report dated Jan. 31, 2002.

* cited by examiner

*Primary Examiner*—Rachel Gorr
(74) *Attorney, Agent, or Firm*—Finnegan, Henderson, Farabow, Garrett & Dunner, LLP

(57) ABSTRACT

Plastic lenses for spectacles having a high refractive index and a high Abbe's number, and having good transparency, heat resistance, mechanical strength and impact resistance are produced. Plastic lenses for spectacles are produced through polymerization of an epithio group-having compound (a), a polythiol compound (b) and a polyisocyanate compound (c) whereby the ratio (by mol) of the polythiol compound (b) to the polyisocyanate compound (c) is at least 1.2 calculated on the basis of —SH and —NCO groups. The invention also provides a process for preparing such lenses and a catalyst for use in said process.

23 Claims, No Drawings

PLASTIC LENSES FOR SPECTACLES

BACKGROUND OF THE INVENTION

The present invention relates to plastic lenses for spectacles, in particular to those having a high refractive index and a high Abbe's number and having good transparency, heat resistance, mechanical strength and impact resistance.

Plastics are being much used these days for optical products such as lenses, as being lightweight, hardly broken and easily colored when compared with glass. It is known to use, as the monomer material, an epithio group-having compound in producing plastic lenses. For example, Japanese Patent Laid-Open No. 180977/1999 discloses a plastic lens having optical properties, a refractive index of 1.70 or so and an Abbe's number of from 35 to 37 or so, which, however, still leaves room for improving its heat resistance and mechanical strength.

Japanese. Patent Laid-Open Nos. 292950/1999 and 352302/1999 disclose a resin composition prepared by reacting an epithio group-having compound, an isocyanate group-having compound and a thiol group-having compound in a ratio of thiol group/isocyanate group of at most 1, and its use for plastic lenses. They say that the resin composition has improved heat resistance, mechanical strength and impact resistance. However, the plastic lenses of the resin composition are often cloudy and could not be well cured, and are therefore unsuitable to practical use for spectacles.

The present invention has been made so as to solve the problems as above, and to provide plastic lenses for spectacles having a high refractive index and a high Abbe's number and having good transparency, heat resistance, mechanical strength and impact resistance.

SUMMARY OF THE INVENTION

The present Inventors have found that (1) a plastic lens produced through polymerization of an epithio group-having compound (a), a mercapto (—SH) group-having polythiol compound (b) and an isocyanate (—NCO) group-having, sulfur-free polyisocyanate compound ($c_0$) in a ratio (by mol), —SH/—NCO, of at least 2.0; (2) a plastic lens produced through polymerization of an epithio group-having compound (a), a mercapto group-having polythiol compound (b) and an isocyanate group-having, sulfur-containing polyisocyanate compound ($c_s$) in a ratio (by mol), —SH/—NCO, of at least 1.2 can attain the desired balance of properties.

DETAILED DESCRIPTION OF THE INVENTION

Specifically, the first aspect of the invention is to provide a plastic lens for spectacles, which is produced through polymerization of an epithio group-having compound, a polythiol compound and a sulfur-free polyisocyanate compound in a ratio (by mol) of the polythiol compound to the sulfur-free polyisocyanate compound, —SH/—NCO, of at least 2.0.

The second aspect of the Invention is to provide a plastic lens for spectacles, which is produced through polymerization of an epithio group-having compound, a polythiol compound and a sulfur-containing polyisocyanate compound in a ratio, (by mol) of the polythiol compound to the sulfur-containing polyisocyanate compound, —SH/—NCO, of at least 1.2.

The polyisocyanate compound (c) may be a mixture of a sulfur-containing polyisocyanate compound ($c_s$) and a sulfur-free polyisocyanate compound ($c_0$). The plastic lens material may be produced through polymerization of at least one polyisocyanate compound selected from di(isocyanatomethyl)bicycloheptane, bis (isocyanatomethyl)-1,4-dithian and dicyclohexylmethane diisocyanate, and an, epithio group-having compound and a polythiol compound. The plastic lens material may also be produced through polymerization of a polyisocyanate compound prepared by mixing bis(isocyanatomethyl)-1,4-dithian with di(isocyanatomethyl)bicycloheptane and/or dicyclohexylmethane diisocyanate, and an epithio group-having compound and a polythiol compound.

In its first aspect, the plastic lens for spectacles of the invention is produced through polymerization of an epithio group-having compound, a polythiol compound and a sulfur-free polyisocyanate compound in a ratio (by mol) of the polythiol compound to the sulfur-free polyisocyanate compound, —SH/—NCO, of at least 2,0. If the ratio —SH/—NCO is smaller than 2.0, the effect of the first aspect of the invention cannot be obtained.

In its second aspect, the plastic lens for spectacles of the invention is produced through polymerization of an epithio group-having compound, a polythiol compound and a sulfur-containing polyisocyanate compound in a ratio (by mol) of the polythiol compound to the sulfur-containing polyisocyanate compound, —SH/—NCO, of at least 1.2. If the ratio —SH/—NCO is smaller than 1.2, the effect of the invention cannot be obtained. Polyisothiocyanate group-having compounds are outside the scope of the sulfur-containing polyisocyanate compound, as not producing then advantages of the invention.

With the increase in the proportion of thiourethane bonds therein, lenses for spectacles could have an increased tensile strength characteristic of polythiourethanes, but their refractive index could not increase. For further increasing the refractive index of the lenses while producing lenses having an increased tensile strength and an increased Abbe's number, heretofore proposed is adding an epithio group-having compound to the lenses. However, in the system for lenses that comprises an epithio group-having compound, a polythiol compound and a sulfur-free polyisocyanate compound, if the polyisocyanate is excessive over the polythiol, as in the Examples in Japanese Patent Laid-Open Nos. 180977/1999 and 292950/1999, the lenses formed are cloudy.

On the other hand, lenses formed from a sulfur-containing polyisocyanate compound, an epithio group-having compound and a polythiol compounds are not cloudy even when the proportion of the sulfur-containing polyisocyanate compound therein is increased. Since the sulfur content and the thiourethane bond content thereof are high, the lenses have an increased refractive index and their mechanical strength and Abbe's number are not lowered.

Some sulfur-containing polyisocyanate compounds such as bis(isocyanatomethyl)-1,4-dithian are solid at room temperature. Such a solid, sulfur-containing polyisocyanate compound may be dissolved in a sulfur-free polyisocyanate compound that is liquid at room temperature. As being liquid at room temperature, the resulting mixture is easy to handle when it is used in producing lenses. In mixing the two, the ratio of the sulfur-containing polyisocyanate compound to the sulfur-free polyisocyanate compound may be so controlled that the liquid, sulfur-free polyisocyanate compound can dissolve the solid, sulfur-containing polyisocyanate compound to give a mixture that is liquid at room temperature. In practice, the ratio of the sulfur-containing polyisocyanate compound and the sulfur-free polyisocyanate compound may be such that the amount of the sulfur-free polyisocyanate compound is enough for dissolving therein the sulfur-containing polyisocyanate compound which is solid at room temperature. The ratio of the two can be readily determined to produce lenses having the desired balance of properties. For example, from 5 to 30 parts by weight of a sulfur-free polyisocyanate may be added to 10 parts by weight of a sulfur-containing polyisocyanate.

A sulfur-free polyisocyanate compound that can be used in the first and second aspects of the invention is di(isocyanatomethyl)bicycloheptane and/or dicyclohexylmethane diisocyanate. A sulfur-containing polyisocyanate compound that can be used is bis(isocyanatomethyl)-1,4-dithian.

The lens for spectacles may be produced through polymerization of at least one polyisocyanate compound selected from di(isocyanatomethyl)bicycloheptane, bis(isocyanatomethyl)-1,4-dithian and dicyclohexylmethane diisocyanate, and an epithio group-having compound and a polythiol compound. The lens for spectacles may also be produced through polymerization of a polyisocyanate compound prepared by mixing bis(isocyanatomethyl)-1,4-dithian with di(isocyanatomethyl)bicycloheptane and/or dicyclohexylmethane diisocyanate, and an epithio group-having compound and a polythiol compound.

Bis(isocyanatomethyl)-1,4-dithian is solid at room temperature. When it is mixed with di(isocyanatomethyl)bicycloheptane and/or dicyclohexylmethane diisocyanate, and dissolved therein, the resulting mixture is liquid at room temperature, and is easy to handle.

The ratio (by mol) of the polythiol compound to the polyisocyanate compound, —SH/—NCO, is preferably at least 2.0, more preferably at least 2.5.

The polythiol compound for use in the invention includes, for example, aliphatic thiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl)thiomalate, (2-mercaptoethyl) 2,3-dimercaptosuccinate, 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane; aliphatic thiols having sulfur atom(s) in addition to mercapto groups, such as bis(mercaptomethyl)sulfide, bis(mercaptoethyl) sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithian, bis(mercaptomethyl) disulfide, bis(mercaptoethyl) disulfide, bis(mercaptopropyl) disulfide, and their thioglycolates and mercaptopropionates,hydroxymethylsulfide bis(2-mercaptoacetate), hydroxymethy bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethyl-ether bis(2-mercaptoacetate), 2-mercaptoethyl-ether bis(3-mercaptopropionate), 1,4-dithian-2,5-diol bis(2-mercaptoacetate), 1,4-dithian-2,5-diol bis(3-mercaptopropionate), bis(2-mercaptoethyl)thioglycolate, bis(2-mercaptoethyl)thiodipropionate, bis(2-mercaptoethyl) 4,4'-thiodibutyrate, bis(2-mercaptoethyl) dithiodiglycolate, bis(2-mercaptoethyl) dithiodipropionate, bis(2-mercaptoethyl) 4,4'-dithiodibutyrate, bis(2,3-dimercaptopropyl)thioglycolate, bis(2,3-dimercaptopropyl) thiodipropionate, bis(2,3-dimercaptopropyl) dithiodiglycolate, (2,3-dimercaptopropyl) dithiodipropionate, 4-mercaptomethyl-3,6-dithiaoctane-1,8-dithiol, bis(mercaptomethyl)-3,6,9-trithia-1,11-undecanedithiol, bis(1,3-dimercapto-2-propyl)sulfide; and heterocyclic compounds having sulfur atom(s) in addition to mercapto groups, such as 3,4-thiophenedithiol, tetrahydrothiophene-2,5-dimercaptomethyl, 2,5-dimercapto-1,3,4-thiadiazole, 2,5-dimercapto-1,4-dithian, 2,5-dimercaptomethyl-1,4-dithian.

The polythiol compound for use in the invention is preferably bismercaptomethyl-1,4-dithian and/or (4-mercaptomethyl-2,5-dithianyl)methyl disulfide.

The epithio group-having compound for use in the invention is an episulfide monomer, including, for example, alicyclic skeleton-having episulfide compounds such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide; aromatic skeleton-having episulfide compounds such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfide, 4,4-bis(β-epithiopropylthio)biphenyl; dithian skeleton-having episulfide compounds such as 2,5-bis(β-epithiopropylthiomethyl)1,4-dithian, 2,5-bis(β-epithiopropylthioethylthiomethyl)-1,4-dithian, 2,5-bis(β-epithiopropylthioethyl)-1,4-dithian, 2,3,5-tri(β- epithiopropylthioethyl)-1,4-dithian; and aliphatic skeleton-having episulfide compounds such as 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane, bis(β-epithiopropyl)sulfide.

Many epithio group-having compounds are known, and their examples are described in, for example, Japanese Patent Laid-Open Nos. 071580/1997, 110979/1997, 255781/1997, 081320/1991, 140070/1999, 183702/1999, 189592/1999, 180977/1999, and Japanese Patent Re-Laid-Open No. 810575/1989. Episulfide monomers disclosed in these publications are all usable in the invention.

Of the epithio group-having compounds mentioned hereinabove, bis(β-epithiopropyl)sulfide is preferred for use in the invention.

Plastic lenses for spectacles of the invention preferably contain from 60 to 85% by weight of the epithio group-having compound and from 15 to 40% by weight of the polythiol compound and the balance polyisocyanate compound. Plastic lenses are produced that have a refractive index of 1.70 or so and an Abbe's number of 36 or so and their mechanical strength is enough for practical use of the lenses in rimless spectacles.

Especially preferred combinations of the polyisocyanate compound, the polythiol compound and the epithio group-having compound for use in the invention are mentioned below.

A. Di(isocyanatomethyl)bicycloheptane (polyisocyanate compound), bis(mercaptomethyl)-1,4-dithian (polythiol compound), and bis(β-epithiopropyl)sulfide (epithio group-having compound).

B. Di(isocyanatomethyl)bicycloheptane (polyisocyanate compound), (4-mercaptomethyl-2,5-dithianyl)methyl disulfide, bis(mercaptomethyl)-1,4-dithian (polythiol compounds), and bis(β-epithiopropyl)sulfide (epithio group-having compound).

C. Bis(isocyanatomethyl)-1,4-dithian (polyisocyanate compound), bis(mercaptomethyl)-1,4-dithian (polythiol compound), and bis(β-epithiopropyl)sulfide (epithio group-having compound).

D. Dicyclohexylmethane diisocyanate (polyisocyanate compound), (4-mercaptomethyl-2,5-dithianyl)methyl disulfide, bis(mercaptomethyl)-1,4-dithian (polythiol compounds), and bis(β-epithiopropyl)sulfide (epithio group-having compound).

E. Bis(isocyanatomethyl)-1,4-dithian and di(isocyanatomethyl)bicycloheptane (polyisocyanate compounds), bis(mercaptomethyl)-1,4-dithian (polythiol compound), and bis(β-epithiopropyl)sulfide (epithio group-having compound).

F. Bis(isocyanatomethyl)-1,4-dithian and dicyclohexylmethane diisocyanate (polyisocyanate compounds), bis(mercaptomethyl)-1,4-dithian (polythiol compound), and bis(β-epithiopropyl)sulfide (epithio group-having compound).

The polymerization reaction according to the present invention may be performed in the presence of a catalyst. Any suitable catalyst may be employed. Specific examples of a suitable catalyst include amines such as aliphatic and aromatic tertiary amines, Lewis acids and dialkyl tin salts such as dibutyltin dichloride and dibutyltin dilaurate.

Preferably, a catalyst of the following general formula (1) is added to the plastic lenses for spectacles of the invention while they are produced through polymerization. The catalyst facilitates the production of lenses with neither optical strain nor striae from the polymerizing compounds, epithio group-having compound, polythiol compound and polyisocyanate compound.

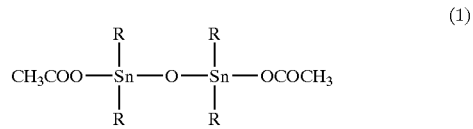

wherein R indicates an alkyl group having from 1 to 4 carbon atoms. The catalyst of formula (1) is preferably at least one selected from tetramethyldiacetoxy-distannoxane, tetraethyldiacetoxy-distannoxane, tetrapropyldiacetoxy-distannoxane and tetrabutyldiacetoxy-distannoxane.

In case where the plastic lenses of the invention are, after produced through polymerization in a mold, difficult to release from the mold, any known external and/or internal lubricant may be used for them or may be added to them to thereby improve the releasability of the lenses. If desired, an UV absorbent may be added to the lenses while they are produced. This is for protecting the resin of the lenses from UV rays and also for protecting the eye from them, and its amount to be added to each lens may fall generally between 0.03% and 3% or so, though depending on its UV absorbability and on the maximum wavelength of the UV rays to be absorbed by it. As the case may be, the lenses produced may be dipped in an UV absorbent. The plastic lenses of the invention are easy to color with a colorant.

For improving their scratch resistance, the plastic lenses of the invention may be coated with a hard film, for which is usable a coating liquid that contains an organosilicon compound or acrylic compound and inorganic fine particles of, for example, tin oxide, silicon oxide, zirconium oxide or titanium oxide. For improving their impact resistance, the plastic lenses may be coated with a primer layer that consists essentially of polyurethane.

For preventing them from glaring, the hard film of the plastic lenses may be further coated with an anti-glare film that contains an inorganic substance of, for example, silicon oxide, titanium dioxide, zirconium oxide or tantalum oxide. For improving their water repellency, the anti-glare film of the plastic lenses may be coated with a water-repellent film of an organic fluorosilicon compound.

The plastic lenses for spectacles of the invention mentioned hereinabove have a refractive index of from 1.65 to 1.76, and their mechanical strength is higher than that of conventional plastic lenses. In addition, they are highly transparent, and have good heat resistance and impact resistance.

The invention is described in more detail with reference to the following Examples, which, however, are not intended to restrict the scope of the invention. The physical properties of the plastic lenses for spectacles produced in the following Examples and Comparative Examples are measured according to the methods mentioned below.

(1) Refractive Index and Abbe's Number

Measured at 20° C. with a precision refractometer, Kalnew's KPR-200 Model.

(2) Heat Resistance

Measured with a thermal analyzer, Rigaku-sha's TAS-100, TMA8140, according to a penetration method (in which the thickness of the sample analyzed is 3 mm, the pin diameter is 0.5 mm, the load is 10 g, and the heating rate is 10° C./min). The peak temperature at which the thermal expansion of the sample has changed is read, and this indicates the heat resistance of the sample.

(3) Tensile Strength

A lens prepared to have a power of 0.00 D, a diameter of 80 mm and a thickness of 1.8 mm is worked to be fittable to a frame of an electronic universal tester (Yonekura Seisakusho's Model CATY200WR). In this, two holes each having a diameter of 1.6 mm are drilled at opposite ends. The thus-worked lens sample is fixed to the tester with 1.6 mmφ pins fitted to its holes, and pulled at a stress rate of 0.05 mm/min, and the tensile strength at break of the sample is measured.

(4) Presence or Absence of Striae

Each sample is macroscopically checked as to whether or not it has striae, according to the schlieren method. The samples thus checked are evaluated on the basis of the following criteria:

O: No striae found.

x: Striae found.

EXAMPLE 1

80.0 parts by weight of an epithio group-having compound, bis(β-epithiopropyl)sulfide, 15.65 parts by weight of a polythiol compound, bis(mercaptomethyl)-1,4-dithian, and 4.35 parts by weight of a polyisocyanate compound, di(isocyanatomethyl)bicycloheptane were mixed with stirring along with 50 ppm of an internal lubricant, a mixture of dibutoxyethyl acid phosphate and butoxyethyl acid phosphate, to which were added 0.01 parts by weight of tetra-n-butyl-1,3-diacetoxy-distannoxane and 0.05 parts by weight of tetrabutylphosphonium bromide both serving as a catalyst. These were stirred and mixed under a reduced pressure of 10 mmHg for about 3 minutes to prepare a monomer composition for lenses. The ratio of —SH/—NCO in this composition is given in Table 1.

Next, the monomer composition was cast into a glass mold for lenses (lens power 0.00 D, lens diameter 80 mm, lens thickness 1.8 mm), which had been previously prepared and equipped with a resin gasket. The mold was put into an electric furnace, and gradually heated therein at from 20° C. up to 100° C. over a period of 20 hours and then kept heated at 100° C. for 30 minutes, through which the monomers were polymerized.

After having been thus polymerized, the lens was released from the mold, and then further heated at 110° C. for 1 hour. It was visually checked for outward appearance, and tested for (1) to (4) as above. The results are given in Table 1.

EXAMPLES 2 to 10

Lenses were produced in the same manner as in Example 1, except that the epithio group-having compound, the polythiol compound and the polyisocyanate compound and their amounts were varied as in Table 1. The lenses were visually checked for appearance, and tested for (1) to (4) as above. The results are given in Table 1.

Comparative Example 1

75.0 parts by weight of an epithio group-having compound, bis(β-epithiopropyl)sulfide, 5.0 parts by weight of a polythiol compound, n-butyl thioglycolate, and 20.0 parts by weight of a polyisocyanate compound, m-xylene diisocyanate were mixed with stirring, to which was added 0.05 parts by weight of a catalyst, tetrabutylphosphonium bromide. These were stirred and mixed under a reduced pressure of 10 mmHg for about 3 minutes to prepare a monomer composition for lenses. The ratio of —SH/—NCO in this composition is given in Table 1.

Next, the monomer mixture was polymerized in the same manner as in Example 1. However, the product obtained was dark brown liquid and was not resinous. Therefore, this was not tested for (1) to (4).

Comparative Example 2

The monomers were polymerized in the same manner as in Comparative Example 1, except that dimercaptoethyl sulfide was used in place of n-butyl thioglycolate.

However, the product obtained was milky, opaque jelly. Therefore, this was not tested for (1) to (4).

Comparative Example 3

80.0 parts by weight of an epithio group-having compound, bis(β-epithiopropyl)sulfide, 5.0 parts by weight of a polythiol compound, n-butyl thioglycolate, and 15.0 parts by weight of a polyisocyanate compound, isophorone diisocyanate were mixed with stirring, to which was added 0.05 parts by weight of a catalyst, tetrabutylphosphonium bromide. These were stirred and mixed under a reduced pressure of 10 mmHg for about 3 minutes to prepare a monomer composition for lenses. The ratio of —SH/—NCO in this composition is given in Table 1.

Next, the monomer mixture was polymerized in the same manner as in Example 1. However, the product obtained was dark brown liquid and was not resinous. Therefore, this was not tested for (1) to (4).

Comparative Example 4

80.0 parts by weight of an epithio group-having compound, bis(β-epithiopropyl)sulfide, 20.0 parts by weight of a polythiol compound, 1,2-bis((mercaptoethyl)thio)-3-mercaptopropane, and 20.0 parts by weight of a polyisocyanate compound, m-xylene diisocyanate were mixed with stirring, to which was added 0.05 parts by weight of a catalyst, dibutyltin dichloride. These were stirred and mixed under a reduced pressure of 10 mmHg for about 3 minutes to prepare a monomer composition for lenses. The ratio of —SH/—NCO in this composition is given in Table 1.

Next, the monomer composition was cast into a glass mold for lenses (lens power 0.00 D, lens diameter 80 mm, lens thickness 1.8 mm), which had been previously prepared and equipped with a resin gasket. The mold was put into an electric furnace, and gradually heated therein at from 20° C. up to 120° C. over a period of 20 hours and then kept heated at 120° C. for 30 minutes, through which the monomers were polymerized.

However, the resin thus obtained was like soft rubber, and had an offensive smell and was much yellowed. Therefore, this was not tested for (1) to (4).

Comparative Example 5

93.0 parts by weight of an epithio group-having compound, bis(β-epithiopropyl)sulfide, 6.0 parts by weight of a polythiol compound, dimercaptoethyl sulfide, and 1.0 part by weight of hydroxyethyl methacrylate were mixed with stirring, to which was added 0.05 parts by weight of a catalyst, tetrabutylphosphonium bromide. These were stirred and mixed under a reduced pressure of 10 mmHg for about 3 minutes to prepare a monomer composition for lenses. The ratio of —SH/—NCO in this composition is given in Table 1.

Next, the monomer mixture was polymerized in the same manner as in Example 1. The lens obtained was visually checked for appearance, and tested for (1) to (4) as above. The results are given in Table 1.

TABLE 1

| | | Polyisocyanate Compound wt. pts. | Polythiol Compound wt. pts. | Blend Ratio (—SH/—NCO) by mol | Epithio group-having Compound wt. pts. | Appearance | Refractive Index | Abbe's Number | Heat Resistance | Tensile Strength kgf | Striae |
|---|---|---|---|---|---|---|---|---|---|---|---|
| Example | 1 | DIMB 4.35 | BMMD 15.65 | 3.5 | BEPS 80.0 | colorless transparent | 1.699 | 36 | 90 | 40 | |
| | 2 | DIMB 5.16 | MMDS/BMMD 7.91/11.93 | 3.0 | BEPS 75.0 | colorless transparent | 1.699 | 36 | 92 | 40 | |
| | 3 | BIMD 9.30 | BMMD 25.70 | 3.0 | BEPS 65.0 | colorless transparent | 1.700 | 36 | 90 | 53 | |
| | 4 | HMDI 6.48 | MMDS/BMMD 15.70/7.82 | 3.0 | BEPS 70.0 | colorless transparent | 1.691 | 36 | 85 | 44 | |
| | 5 | BIMD 12.22 | BMMD 20.28 | 1.80 | BEPS 67.50 | colorless transparent | 1.697 | 36 | 89 | 53 | |
| | 6 | BIMD 13.64 | BMMD 18.861 | 1.50 | BEPS 67.50 | colorless transparent | 1.696 | 36 | 92 | 56 | |
| | 7 | BIMD 15.10 | BMMD 17.40 | 1.25 | BEPS 67.50 | colorless transparent | 1.695 | 36 | 96 | 60 | |
| | 8 | BIMD/DIMB 6.88/4.10 | BMMD 19.02 | 1.80 | BEPS 70.00 | colorless transparent | 1.694 | 36 | 89 | 49 | |
| | 9 | BIMD/DIMB 7.00/4.18 | BMMD 18.82 | 1.75 | BEPS 70.00 | colorless transparent | 1.694 | 36 | 92 | 54 | |
| | 10 | BIMD/DIMB 8.93/3.43 | BMMD 17.64 | 1.50 | BEPS 70.00 | colorless transparent | 1.694 | 36 | 95 | 51 | |
| Comparative Examples | 1 | XDI 20.00 | BTG 5.00 | 0.16 | BEPS 75.0 | Not cured (dark brown liquid) | | | | | |
| | 2 | XDI 20.00 | DMES 5.00 | 0.31 | BEPS 75.0 | Not cured (milky, opaque jelly) | | | | | |
| | 3 | IPDI 15.00 | BTG 5.00 | 0.25 | BEPS 80.0 | Not cured (dark brown liquid) | | | | | |
| | 4 | XDI 20.00 | DMTMP 20.00 | 1.08 | BEPS 60.0 | Yellow soft rubber | | | | | |
| | 5 | — | DMES/HEMA 6.00/1.00 | — | BEPS 93.0 | colorless transparent | 1.700 | 36 | 90 | 25 | |

Notes
DIMB: di(isocyanatomethyl)bicycloheptane
BIMD: bis(isocyanatomethyl)-1,4-dithian
HMDI: dicyclohexylmethane diisocyanate
BMMD: bis(mercaptomethyl)-1,4-dithian
MMDS: (4-mercaptomethyl-2,5-dithianyl)methyl disulfide
BEPS: bis(β-epithiopropyl)sulfide
XDI: m-xylene diisocyanate
IPDI: isophorone diisocyanate
BTG: n-butyl thioglycolate
DMES: dimercaptoethyl sulfide
DMTMP: 1,2-bis((mercaptoethyl)thio)-3-mercaptopropane
HEMA: hydroxyethyl methacrylate As in Table 1, the lenses of Examples 1 to 10 are all colorless transparent, and have a high refractive index and a high Abbe's number, and their heat resistance and tensile strength are all good.

As described in detail hereinabove, the plastic lenses for spectacles of the invention have a high refractive index and a high Abbe's number. They are transparent, and have good heat resistance, mechanical strength and impact resistance. Therefore, they are suitable to spectacles.

What is claimed is:

1. A process for preparing a material suitable for a transparent lens comprising polymerizing an epithio group having compound (a), a polythiol compound (b) and a polyisocyanate compound (c) wherein the ratio (by mol) of polythiol compound (b) to polyisocyanate compound (c) is at least 1.75 calculated on the basis of —SH and —NCO groups, and wherein the polyisocyanate compound (c) comprises at least one sulfur-containing polyisocyanate compound.

2. The process of claim 1 wherein the polyisocyanate compound (c) is a mixture of at least one sulfur-free polyisocyanate compound and at least one sulfur-continuing polyisocyanate compound.

3. A process for preparing a material suitable for a transparent lens comprising polymerizing an epithio group-having compound (a), a polythiol compound (b) and a polyisocyanate compound (c) wherein the ratio (by mol) of polythiol compound (b) to polyisocyanate compound (c) is at least 2 calculated on the basis of —SH and —NCO groups, and wherein the polyisocyanate compound (c) is sulfur-free and comprises at least one sulfur-free polyisocyanate compound.

4. Process according to any one of claims 1, 2 or 3 comprising polymerizing from 60 to 85% by weight of the epithio group-having compound (a), from 15 to 40% by weight of the polythiol compound (b), and the balance polyisocyanate compound (c).

5. Process according to any one of claims 1, 2 or 3 wherein polymerization is conducted in the presence of a catalyst of the following general formula (1):

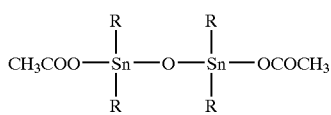

wherein R indicates an alkyl group having from 1 to 4 carbon atoms.

6. Process according to claim 5 wherein the catalyst of formula (1) is at least one selected from tetramethyldiacetoxy-distannoxane, tetraethyldiacetoxy-distannoxane, tetrapropyldiacetoxy-distannoxane and tetrabutyldiacetoxy-distannoxane.

7. A transparent lens for spectacles made of a material obtainable according to the process of claim 1.

8. A transparent lens for spectacles according to claim 7 wherein compound (a) is bis(β-epithiopropyl)sulfide, compound (b) is bis(mercaptomethyl)-1,4-dithian, and compound (c) is bis(isocyanatomethyl)-1,4-dithian.

9. A plastic lens for spectacles made of a material obtainable according to the process of claim 2.

10. A transparent lens for spectacles according to claim 9 wherein compound (a) is bis(β-epithiopropyl)sulfide, compound (b) is bis(mercaptomethyl)-1,4-dithian, and compound (c) is a mixture of bis(isocyanatomethyl)-1,4-dithian and di(isocyanatomethyl)bicycloheptane.

11. A transparent lens for spectacles made of a material obtainable according to the process of claim 3.

12. A transparent lens for spectacles according to claim 11 wherein compound (a) is bis(β-epithiopropyl)sulfide, compound (b) is a mixture of (4-mercaptomethyl-2,5-dithianyl)methyl disulfide and bis(mercaptomethyl)-1,4-dithian, and compound (c) is dicyclohexylmethane diisocyanate.

13. A transparent lens for spectacles made of a material obtainable according to the process of claim 4.

14. A transparent lens according to either claim 9 or 11, wherein the sulfur-free polyisocyanate compound (c) is at least one of di(isocyanatomethyl)bicycloheptane and dicyclohexylmethane diisocyanate.

15. A transparent lens according to either claim 7 or 9, wherein the sulfur-containing polyisocyanate compound is bis(isocyanatomethyl)-1,4-dithian.

16. A transparent lens according to claim 9 wherein the polyisocyanate compound (c) is selected from di(isocyanatomethyl)bicycloheptane, bis(isocyanatomethyl)-1,4-dithian and dicyclohexylmethane diisocyanate.

17. A transparent lens according to claim 9 wherein the polyisocyanate compound (c) is a mixture of bis(isocyanatomethyl)-1,4-dithian with at least one of di(isocyanatomethyl)bicycloheptane and dicyclohexylmethane diisocyanate.

18. A transparent lens according to any of claims 7, 9 or 11 wherein the polythiol compound (b) is at least one of bismercaptomethyl-1,4-dithian and (4-mercaptomethyl-2,5-dithianyl)methyl disulfide.

19. A transparent lens according to any of claims 7, 9 or 11 wherein the epithio group-having compound (a) is bis(β-epithiopropyl)sulfide.

20. A transparent lens according to claim 7 which is coated with a hard film of an organosilicon compound.

21. A transparent lens according to claim 20 wherein the hard film is further coated with an anti-glare film of an inorganic substance.

22. A transparent lens according to claim 21 wherein the anti-glare film is further coated with a water-repellent film of a fluorine-containing silicon compound.

23. A transparent lens according to claim 7 which has a refractive index of from 1.65 to 1.76.

* * * * *

UNITED STATES PATENT AND TRADEMARK OFFICE
CERTIFICATE OF CORRECTION

PATENT NO.    : 6,743,886 B2
DATED         : June 1, 2004
INVENTOR(S)   : Masahisa Kosaka It is certified that error appears in the above-identified patent and that said Letters Patent is hereby corrected as shown below:

Column 9, line 67 through Column 10, line 1,
"group having" should read -- group-having --.

Column 10,
Line 48, "sulfur-continuing" should read -- sulfur-containing --.

Signed and Sealed this

Twenty-third Day of November, 2004

JON W. DUDAS
*Director of the United States Patent and Trademark Office*